United States Patent
Arnold et al.

(10) Patent No.: US 12,522,936 B2
(45) Date of Patent: Jan. 13, 2026

(54) POLYALKANOLAMINES

(71) Applicant: BASF SE, Ludwigshafen am Rhein (DE)

(72) Inventors: Marco Arnold, Ludwigshafen (DE); Alexander Fluegel, Ludwigshafen (DE); Charlotte Emnet, Ludwigshafen (DE); Nadine Engelhardt, Ludwigshafen (DE)

(73) Assignee: BASF SE, Ludwigshafen Am Rhein (DE)

( * ) Notice: Subject to any disclaimer, the term of this patent is extended or adjusted under 35 U.S.C. 154(b) by 622 days.

(21) Appl. No.: 18/001,078

(22) PCT Filed: Jun. 7, 2021

(86) PCT No.: PCT/EP2021/065108
§ 371 (c)(1),
(2) Date: Dec. 8, 2022

(87) PCT Pub. No.: WO2021/249906
PCT Pub. Date: Dec. 16, 2021

(65) Prior Publication Data
US 2023/0235471 A1  Jul. 27, 2023

(30) Foreign Application Priority Data
Jun. 10, 2020 (EP) .................................... 20179297

(51) Int. Cl.
| C25D 3/38 | (2006.01) |
| C08G 73/02 | (2006.01) |
| C08K 3/08 | (2006.01) |
| C08K 5/3415 | (2006.01) |
| C25D 7/12 | (2006.01) |

(52) U.S. Cl.
CPC ............. *C25D 3/38* (2013.01); *C08G 73/024* (2013.01); *C08K 3/08* (2013.01); *C08K 5/3415* (2013.01); *C25D 7/12* (2013.01); *C08K 2003/085* (2013.01)

(58) Field of Classification Search
None
See application file for complete search history.

(56) References Cited

U.S. PATENT DOCUMENTS

| 4,505,839 A | 3/1985 | Bellos et al. |
| 5,393,463 A | 2/1995 | Fikentscher et al. |
| 8,129,326 B2 * | 3/2012 | Misske ................ C08G 73/024 510/423 |
| 2003/0220415 A1 * | 11/2003 | Worley .................. A01N 43/50 528/73 |

FOREIGN PATENT DOCUMENTS

| EP | 0441198 A2 | 8/1991 | |
| EP | 2199315 A1 | 6/2010 | |
| WO | 2009060060 A1 | 5/2009 | |
| WO | 2010069810 A1 | 6/2010 | |
| WO | 2010115717 A1 | 10/2010 | |
| WO | 2010115756 A1 | 10/2010 | |
| WO | 2010115757 A1 | 10/2010 | |
| WO | 2010115796 A1 | 10/2010 | |
| WO | 2011012462 A2 | 2/2011 | |
| WO | 2011012475 A1 | 2/2011 | |
| WO | WO-2011032640 A2 * | 3/2011 | ............. C08G 12/00 |
| WO | 2011064154 A2 | 6/2011 | |
| WO | 2011151785 A1 | 12/2011 | |
| WO | 2012085811 A1 | 6/2012 | |
| WO | 2014072885 A2 | 5/2014 | |

(Continued)

OTHER PUBLICATIONS

International Search Report and Written Opinion for corresponding PCT/EP2021/065108 mailed Oct. 18, 2021; 8 pages.
European Search Report for EP Patent Application No. 20179297.5, Issued on Dec. 17, 2020, 3 pages.

*Primary Examiner* — Sanza L. McClendon
(74) *Attorney, Agent, or Firm* — Armstrong Teasdale LLP

(57) ABSTRACT

Disclosed herein is a A polyalkanolamine including the structure of formula L1

$$[A^L]_n[B^L]_m \quad (L1)$$

wherein $A^L$ is 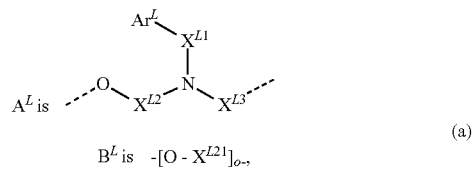 (a)

$B^L$ is $-[O - X^{L21}]_o-,$ (b)

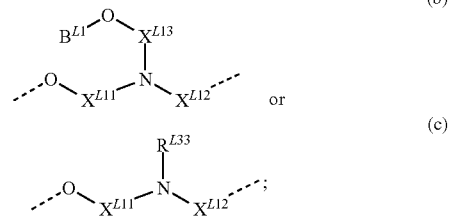

or (c)

$X^{L1}, X^{L2}, X^{L3}$ are independently selected from a $C_1$ to $C_6$ alkanediyl;
$Ar^L$ is a 5 or 6 membered N-heteroaromatic ring system including from 1 to 4 N atoms, which may be unsubstituted or substituted by $C_1$ to $C_6$ alkyl;
n is an integer of from 2 to 350;
m is 0 or an integer of from 1 to 600;
o is 1 or an integer of from 2 to 25;
$B^{L1}$ is a continuation of the backbone $B^L$ by branching;
$X^{L11}, X^{L12}, X^{L13}$ are independently selected from a $C_1$ to $C_6$ alkanediyl;
$X^{L21}$ is a $C_1$ to $C_6$ alkanediyl;
and derivatives thereof obtainable by N-protonation, N-quaternization, substitution, or polyalkoxylation.

20 Claims, No Drawings

(56) References Cited

FOREIGN PATENT DOCUMENTS

| WO | WO-2015037301 A1 * | 3/2015 | ............... C09G 1/02 |
|----|---------------------|--------|----|
| WO | 2016020216 A1 | 2/2016 | |
| WO | 2018073011 A1 | 4/2018 | |
| WO | 2018114985 A1 | 6/2018 | |
| WO | 2018219848 A1 | 12/2018 | |

* cited by examiner

POLYALKANOLAMINES

CROSS-REFERENCE TO RELATED APPLICATIONS

This application is a U.S. National Phase Application of International Patent Application No. PCT/EP2021/065108, filed Jun. 7, 2021, which claims priority to European Patent Application No. 20179297.5 filed Jun. 10, 2020, each of which is hereby incorporated by reference herein.

BACKGROUND OF THE INVENTION

The invention relates to polyalkanolamines, a copper electroplating composition comprising the polyalkanolamines, their use, and a process for copper bump electrodeposition.

Bumps are formed on a surface of a wafer having integrated circuits, such as LSIs. Such bumps constitute a part of interconnects of an integrated circuit and serve as terminals for connection to a circuit of an external package substrate (or a circuit substrate). The bumps are generally disposed along a periphery of a semiconductor chip (or die) and are connected to an external circuit by gold wires according to a wire bonding method or by leads according to a TAB method.

With the recent progress toward higher integration and higher density of semiconductor devices, the number of bumps for connection to external circuits is increasing, giving rise to the necessity to form bumps over the entire area of the surface of a semiconductor chip. Further, the need for shorter interconnect spacing has led to the use of a method (flip chip method) which involves flipping a semiconductor chip having a large number of bumps formed on its surface and connecting the bumps directly to a circuit substrate.

Electroplating is widely employed as a method of forming bumps. A process of forming bumps on a surface of a wafer having integrated circuits is one of the most important processes in a final stage of manufacturing of a semiconductor device. It is to be noted in this regard that an integrated circuit is formed on a wafer through many manufacturing processes. Therefore, very high reliability is required for a bump forming process which is performed on a wafer that has passed all the preceding processes. With the progress toward smaller-sized semiconductor chips, the number of bumps for connection to external circuits is increasing and bumps themselves are becoming smaller sized. Accordingly, a need exists to enhance the accuracy of positioning for bonding of a semiconductor chip to a circuit substrate such as a package substrate. In addition, there is a strong demand for no defect being produced in a bonding process in which bumps are melted and solidified.

Generally, copper bumps are formed on a seed layer of a wafer which is electrically connected to integrated circuits. A resist having openings is formed on a seed layer, and copper is deposited by copper electroplating on the exposed surface of the seed layer in the openings to thereby form copper bumps. The seed layer comprises a barrier layer, e.g. composed of titanium, to prevent diffusion of copper into the dielectric. After filling the openings in the resist with copper, the resist is removed, and then the copper bumps are subjected to reflow processing.

The need to fit more functional units into ever-tinier spaces drives the integrated circuit industry to bump processes for package connections. A second driver is to maximize the amount of input/output connections for a given area. With decreasing diameter of and distance between the bumps the connection density can be increased. These arrays are realized with copper bumps or µ-pillars on which a tin or tin alloy solder cap is plated. In order to assure that every bump is getting contacted across a wafer, besides a void-free deposition and reflow, uniform deposition height is needed.

To achieve this uniform deposition so-called levelers may be used. In literature, a variety of different leveling compounds has been described for other electroplating applications. In most cases, leveling compounds are N-containing and optionally substituted and/or quaternized polymers, such as polyethylene imine, polyglycine, poly(allylamine), polyaniline (sulfonated), polyurea, polyacrylamide, poly(melamine-co-formaldehyde), reaction products of amines with epichlorohydrin, reaction products of an amine, epichlorohydrin, and polyalkylene oxide, reaction products of an amine with a polyepoxide, polyvinylpyridine, polyvinylimidazole, polyvinylpyrrolidone, polyalkoxylated polyamides and polyalkanolamines.

WO 2010/069810 discloses trialkanol and dialkanol homo- and co-condensates for use in copper interconnect plating. Dialkanolamines like diethanolamine, N-methyldiethanolamine, N,N-bis(2-hydroxypropyl)-N-methylamine, N,N-bis(2-hydroxybutyl)-N-methylamine, N-isopropyldiethanolamine, N-n-butyldiethanolamine, N-sec-butyldiethanolamine, N-cyclohexyldiethanolamine, N-benzyldiethanolamine, N-4-tolyldiethanolamine or N,N-bis(2-hydroxyethyl)aniline are specifically mentioned.

WO 2009/060060 A1 discloses the manufacture of a polymer obtainable by condensation of N-(hydroxy-alkyl) amines and reacting the remaining hydroxy and/or secondary amino groups of the condensation product with alkylene oxides and derivatives obtainable by quaternization, protonation, sulphation and/or phosphation of said polymers.

There is still a need in the electronic industry for an acidic copper electroplating bath which leads to bump deposits with a good morphology, particularly a low roughness, in combination with an improved uniformity in height, also called within-die coplanarity (COP).

It is an object of the present invention to provide an acidic copper electroplating composition that provides copper deposits showing a good morphology, particularly a low roughness and which is capable of filling recessed features on the micrometer scale without substantially forming defects, such as but not limited to voids. It is a further object of the present invention to provide a copper electroplating bath that provides a uniform and planar copper deposit, in particular in recessed features of 500 nanometers to 500 micrometers widths such as bumps.

SUMMARY OF THE INVENTION

Surprisingly, it has now been found, that the use of particular polyalkanolamines show extraordinary leveling properties in copper bump electroplating.

Therefore, the present invention provides a polyalkanolamine comprising the structure of formula L1

$$[A^L]_n[B^L]_m \qquad (1)$$

wherein $A^L$ is
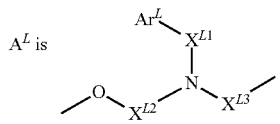

-continued $B^L$ is

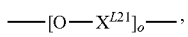
(a)

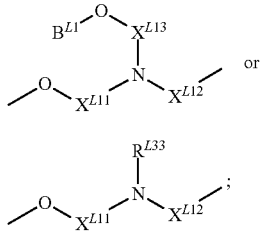

(b)

or (c)

$X^{L1}$, $X^{L2}$, $X^{L3}$ are independently selected from a $C_1$ to $C_6$ alkanediyl;

$Ar^L$ is a 5 or 6 membered N-heteroaromatic ring system comprising from 1 to 4 N atoms, which ring system may be unsubstituted or substituted by $C_1$ to $C_6$ alkyl;

n is an integer of from 2 to 350;

m is 0 or an integer of from 1 to 600;

o is 1 or an integer of from 2 to 25;

$B^{L1}$ is a continuation of the backbone $B^L$ by branching;

$R^{L33}$ is H or a $C_1$ to $C_6$ alkyl;

$X^{L11}$, $X^{L12}$, $X^{L13}$ are independently selected from a $C_1$ to $C_6$ alkanediyl;

$X^{L21}$ is a $C_1$ to $C_8$ alkanediyl;

and derivatives thereof obtainable by N-protonation, N-quaternization, N- or O-substitution, or N- or O-alkoxylation.

The invention further relates to a composition for copper electroplating comprising copper ions and at least one polyalkanolamine as described herein.

The compositions comprising the alkanolamines according to the present invention are particularly useful for filling of recessed features having aperture sizes of 500 nm to 500 µm with copper, particularly those having aperture sizes of 1 to 200 µm. The additives are particularly useful for depositing copper bumps.

Due to the leveling effect of the additives, surfaces are obtained with an improved coplanarity of the plated copper bumps. Therefore, the additives according to the inventions are also referred to herein as "leveling agents" even if the leveling function is not comparable with a leveling agent for interconnect plating with recessed features of much smaller size. Furthermore, the copper deposits show a good morphology, particularly a low roughness. The electroplating composition is capable of filling recessed features on the micrometer scale without substantially forming defects such as but not limited to voids.

Furthermore, the leveling agents according to the invention lead to reduced impurities, such as but not limited to organics, chloride, sulfur, nitrogen, or other elements. It shows large grains and an improved conductivity. It also facilitates high plating rates and allows plating at elevated temperature.

The invention further relates to the use of the composition as described herein for depositing copper on a substrate comprising a recessed feature comprising a conductive feature bottom and a dielectric feature side wall, wherein the recessed feature has an aperture size from 500 nm to 500 µm.

The invention further relates to a process for electrodepositing copper on a substrate comprising a recessed feature comprising a conductive feature bottom and a dielectric feature side wall, the process comprising:

(a) contacting a composition as described herein with the substrate, and
(b) applying a current to the substrate for a time sufficient to deposit a copper layer into the recessed feature, wherein the recessed feature has an aperture size from 500 nm to 500 µm.

DETAILED DESCRIPTION OF THE INVENTION

It has been found, that the particular alkanolamines as described herein may advantageously be used as leveling agents in copper electroplating of bump structures showing an improved leveling performance.

As used herein, "accelerator" refers to an organic additive that increases the plating rate of the electroplating bath. The terms "accelerator" and "accelerating agent" are used interchangeably throughout this specification. In literature, sometimes the accelerator component is also named "brightener" or "brightening agent". "Suppressing agent" or "suppressor" refers to an organic compound that decreases the plating rate of the electroplating bath and ensures that the recessed features are voidless filled from the bottom to the top (so called "bottom-up filling"). The terms "suppressors" and "suppressing agents" are used interchangeably throughout this specification. "Leveler" refers to an organic compound that is capable of providing a substantially planar metal deposit over areas with a higher or lower number of recessed features, or different areas across a wafer or die. The terms "levelers", "leveling agents" and "leveling additive" are used interchangeably throughout this specification.

"Aperture size" according to the present invention means the smallest diameter or free distance of a recessed feature before plating. The terms "width", "diameter", "aperture" and "opening" are used herein, depending on the geometry of the feature (trench, via, etc.) synonymously. As used herein, "aspect ratio" means the ratio of the depth to the aperture size of the recessed feature.

"Alkanediyl" and "alkyl", unless explicitly specified, refer to unsubstituted linear, branched or cyclic bivalent and monovalent alkane groups, respectively.

Polyalkanolamines According to the Invention

The polyalkanolamines according to the inventions are compounds comprising the structure of formula L1

$$[A^L]_n[B^L]_m \quad (1)$$

wherein
$A^L$ is

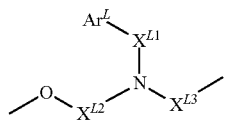

$B^L$ is selected from (a)

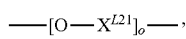

(b)

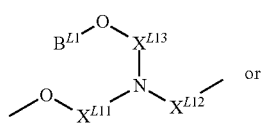

or

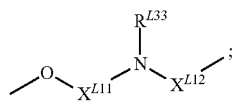

(c)

$X^{L1}$, $X^{L2}$, $X^{L3}$ are independently selected from a $C_1$ to $C_6$ alkanediyl;

$Ar^L$ is a monovalent 5 or 6 membered N-heteroaromatic ring system comprising from 1 to 4 N atoms, preferably 1 or 2 N atoms, which ring system may be unsubstituted or substituted by $C_1$ to $C_6$ alkyl;

n is an integer of from 2 to 350;

m is 0 or an integer of from 1 to 600;

o is 1 or an integer of from 2 to 25;

$B^{L1}$ is a continuation of the backbone $B^L$ by branching;

$R^{L33}$ is H or a $C_1$ to $C_6$ alkyl;

$X^{L11}$, $X^{L12}$, $X^{L13}$ are independently selected from a $C_1$ to $C_6$ alkanediyl;

$X^{L21}$ is a $C_1$ to $C_8$ alkanediyl;

and derivatives thereof obtainable by N-protonation, N-quaternization, N- or O-substitution, or N- or O-alkoxylation.

In the formulas the dotted bond lines indicate a bond to the next repeating unit (also referred to as "polymer fragment" or "monomeric unit") in the polymer or a termination group.

The polyalkanolamines according to the invention comprise the specific repeating unit $A^L$ derived from a dialkanolamine and optionally a repeating unit $B^L$ derived from other dihydroxy compounds.

The polyalkanolamines comprise a monovalent 5 or 6 membered N-heteroaromatic ring system $Ar^L$ which comprises from 1 to 4 N atoms. $Ar^L$ may be unsubstituted or substituted by $C_1$ to 06 alkyl, particularly methyl or ethyl. Examples of a 5 membered N-heterocyclic group are, without limitation, pyrrole, imidazole, pyrazole, triazole, and tetrazole groups. Examples of a 6 membered N-heterocyclic group are, without limitation, pyridine, pyrimidine, and pyrazine. In a preferred embodiment the 5 or 6 membered N-heteroaromatic ring system $Ar^L$ comprises from 1 to 3 N atoms, particularly 1 or 2 N-atoms. Preferred groups $Ar^L$ are imidazolyl, pyridyl, and pyrimidyl. Particular preferred groups $Ar^L$ are selected from imidazole-1-yl, and pyridyl.

Generally, the divalent spacer groups $X^{L1}$, $X^{L2}$, $X^{L3}$ in $A^L$ may be the same or different and are independently selected from a $C_1$ to $C_6$ alkanediyl such as but not limited to methanediyl, ethane-1,2-diyl, propane-1,3-diyl, propane-1,2-diyl, 2-methylpropane-1,2-diyl, 2,2-dimethylpropane-1,3-diyl, butane-1,4-diyl, butane-1,3-diyl, butane-1,2-diyl, butane-2,3-diyl, 2-methylbutane-1,3-diyl, 3-methylbutane-1,3-diyl, pentane-1,2-diyl, pentane-1,5-diyl, pentane-2,5-diyl, 2-methylpentane-2,5-diyl, and hexane-1,6-diyl. In a preferred embodiment, $X^{L1}$, $X^{L2}$, $X^{L3}$ are independently selected from a $C_2$ to $C_4$ alkanediyl, particularly ethanediyl and propanediyl. In another preferred embodiment $X^{L1}$, $X^{L2}$, $X^{L3}$ are independently selected from methanediyl, ethane-1,2-diyl, propane-1,3-diyl, and butane-1,4-diyl, pentane-1,5-diyl, and hexane-1,6-diyl. Most preferably $X^{L1}$, $X^{L2}$, $X^{L3}$ are independently selected from ethane-1,2-diyl, propane-1,3-diyl or propane-1,2-diyl. Preferably $X^{L2}$ and $X^{L3}$ are the same and $X^{L1}$ is the same or different.

The number of repeating units n in the polyalkanolamine is an integer of from 2 to 350, preferably from 3 to 200, more preferably from 4 to 150, most preferably from 5 to 100.

Since, in contrast to the dialkanolamine condensates $[A^L]_n$, the co-condensation with trialkanolamines may form branched structures, they usually comprise a continuation $B^{L1}$ of the backbone by branching, i.e. the alkanolamine backbone is continued in the branch. This behavior is comparable with branched polyethyleneimines.

In a first embodiment m is zero, i.e. the polyalkanolamines are compounds of formula $[A^L]_n$.

In a first alternative of the first embodiment the polyalkanolamines are homo-condensates $[A^L]_n$, wherein all fragments $A^L$ are all the same. In a second alternative of the first embodiment the polyalkanols are co-condensates comprising different monomeric fragments $A^L$ such as but not limited to $[A^{L1}]_p[A^{L2}]_q$ or $[A^{L1}]_p[A^{L2}]_q[A^{L2}]_r$ are formed, wherein the sum of p+q or p+q+r, respectively, corresponds to n. Non-limiting examples of such co-condensates are those with different heteroaromatic substituents $Ar^L$ or different spacers $X^{L1}$, $X^{L2}$, and/or $X^{L3}$. Preferred polyalkanols are homo-condensates consisting of only one sort of repeating units $[A^L]$.

In a second embodiment m is an integer greater than zero, i.e. co-condensates $[A^L]_n[B^L]_m$ are formed.

In a first alternative of the second embodiment $B^L$ is an ether fragment —[O—$X^{L21}$]$_o$— derived from an alkanol comprising at least two hydroxy groups, wherein $X^{L21}$ is a $C_1$ to $C_8$ alkanediyl and o is either 1 or an integer from 2 to 25. Preferably $X^{L21}$ is selected from methanediyl, ethane-1,2-diyl, propane-1,3-diyl, propane-1,2-diyl, 2-methylpropane-1,2-diyl, 2,2-dimethylpropane-1,3-diyl, butane-1,4-diyl, butane-1,3-diyl, butane-1,2-diyl, butane-2,3-diyl, 2-methylbutane-1,3-diyl, 3-methylbutane-1,3-diyl, pentane-1,2-diyl, pentane-1,5-diyl, pentane-2,5-diyl, 2-methylpentane-2,5-diyl and hexane-1,6-diyl. Most preferably $X^{L21}$ is ethane-1,2-diyl, propane-1,3-diyl or propane-1,2-diyl, butane-1,4-diyl, pentane-1,5-diyl, and hexane-1,6-diyl, heptane-1,7-diyl, octane-1,8-diyl. In one preferred embodiment o is 1 and $X^{L21}$ is selected from methanediyl, ethane-1,2-diyl, propane-1,3-diyl, butane-1,4-diyl, pentane-1,5-diyl, and hexane-1,6-diyl. In another preferred embodiment o is an integer from 2 to 25, preferably from 3 to 20, most preferably from 5 to 20, and $X^{L21}$ is selected from ethane-1,2-diyl, propane-1,2-diyl, and butane-1,2-diyl.

In a second alternative of the second embodiment $B^L$ is an aminoether fragment derived from a trialkanolamine

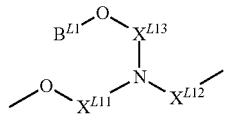

wherein $X^{L11}$, $X^{L12}$, $X^{L13}$ are the same or different and independently selected from a $C_1$ to $C_6$ alkanediyl. Preferably $X^{L11}$, $X^{L12}$, $X^{L13}$ are independently selected from methanediyl, ethanediyl, propane-1,2-diyl, propane-1,3-diyl or butane-1,2-diyl, and derivatives of the latter. Preferably $X^{L11}$, $X^{L12}$ are the same and $X^{L13}$ is the same or different. The spacers $X^{L11}$, $X^{L12}$, and $X^{L13}$ in $B^L$ may be the same as the respective spacers $X^{L1}$, $X^{L2}$, $X^{L3}$ in $A^L$ or they may be different; preferably $X^{L11}$, $X^{L12}$, and $X^{L13}$ are the same as $X^{L1}$, $X^{L2}$, $X^{L3}$, respectively.

Since in contrast to the linear backbones according to the first alternative above and due to is N content the use of trialkanoamine co-monomers allow branching and usually form branched polymer structures. Therefore, in this alternative the repeating unit $B^L$ comprises continuations $B^{L1}$ of the backbone by branching.

In a third alternative of the second embodiment $B^L$ is an aminoether fragment derived from an unsubstituted or substituted dialkanolamine

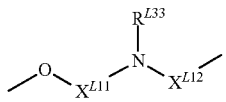

wherein $X^{L11}$, $X^{L12}$, $X^{L13}$ are the same or different and independently selected from a $C_1$ to $C_6$ alkanediyl. Preferably $X^{L11}$, $X^{L12}$, $X^{L13}$ are independently selected from methanediyl, ethanediyl, propane-1,2-diyl, propane-1,3-diyl or butane-1,2-diyl, and derivatives of the latter. Preferably $X^{L11}$, $X^{L12}$ are the same and $X^{L13}$ is the same or different; and $R^{L33}$ may be H or a substituent selected from $C_1$ to $C_6$ alkyl, particularly from H and $C_1$ to $C_4$ alkyl, most particularly H, methyl and ethyl.

The number of n fragments $[A^L]$ and m fragments $[B^L]$ in the co-condensates $[A^L]_n[B^L]_m$ may be arranged in the polymer backbone in any order. They may particularly be arranged in block, random, alternating, or gradient order. As used herein, "random" means that the comonomers are polymerized from a mixture and therefore arranged in a statistically manner depending on their copoymerization parameters. As used herein, "block" means that the comonomers are polymerized after each other to form blocks of the respective co-monomers in any predefined order. As used herein, "gradient" means that the concentration of the comonomers $A^L$ and $B^L$ is varied during the co-condensation.

The polaylkanolamines according to the present invention may be prepared by condensing the respective dialkanolamines

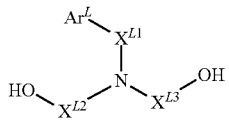

to form homo-condensates or co-condensates with other dialkanolamines.

Examples of preferred dialkanolamines comprise 2-[2-hydroxyethyl(3-imidazol-1-ylpropyl)amino]ethanol; 2-[2-hydroxyethyl-[3-(4-pyridyl)propyl]amino]ethanol; 1-[2-[bis (2-hydroxyethyl)amino]ethyl]pyrrolidine-2-one; 2-[(2-hydroxyethyl)(2-(1,2,4-triazol-1-yl)ethyl]amino]ethanol; 2-[(2-hydroxyethyl)-[2-(tetrazol-1-yl)ethyl]amino]ethanol. Particular preference is given to 2-[2-hydroxyethyl(3-imidazol-1-ylpropyl)amino]ethanol and 2-[2-hydroxyethyl-[3-(4-pyridyl)propyl]amino]ethanol.

Alternatively, it is possible to co-condensates the dialkanolamines with dialcohols HO—$X^{L21}$—OH, trialkanolamines

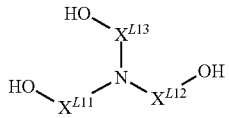

or other dialkanolamines

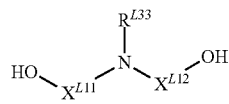

to from co-condensates $[A^L]_n[B^L]_m$. Preferred trialkanolamines are selected from the group of triethanolamine, triisopropanolamine and tributan-2-olamine.

If comonomers $B^L$ are present, m may be an integer of from 1 to 600, preferably from 3 to 250, more preferably from 4 to 150, most preferably from 5 to 100.

The ratio between m and n, if not 0, may be from about 95:5 to about 5:95. In a preferred embodiment the ratio between m and n may be from about 90 to 10 to about 70 to 30. In another preferred embodiment the ratio between m and n may be from about 35 to 65 to about 65 to 35.

The polycondensation of components may be carried out by methods known in principle to those skilled in the art while heating the components, with elimination of water. Suitable methods are disclosed, for example, by EP 441 198 A2. It will be appreciated that it is in each case also possible to use mixtures of different components in appropriate amouts.

The condensation is performed typically at temperatures of from 120 to 280° C., preferably from 150 to 260° C. and more preferably from 180 to 240° C. The water formed is preferably distilled off. The reaction time is typically from 1 to 16 h, preferably from 2 to 8 h. The degree of condensation can be controlled in a simple manner through the reaction temperature and time.

The polycondensation is preferably carried out in the presence of an acid, preferably phosphorous acid ($H_3PO_3$) and/or hypophosphorous acid ($H_3PO_2$). Preferred amounts are from 0.05 to 2% by weight, preferably from 0.1 to 1% b weight, based on the components to be condensed. In addition to the acid, it is also possible to use additional catalysts, for example, zinc halides or aluminum sulfate, if appropriate in a mixture with acetic acid, as disclosed, for example by U.S. Pat. No. 4,505,839.

The polyalkanolamines as described above may be used in its protonated form, particularly if used in an acidic electroplating composition.

The polyalkanolamines may be used as such (including its protonated form), which is preferred, or may optionally be further modified to receive derivatives thereof obtainable by quaternization, substitution, or polyalkoxylation. As used herein, O- (and if applicable N-)substitution means any substitution that does not jeopardize the leveling properties of the polyalkanolamines.

In one embodiment the tertiary amino groups present in the polyalkanolamine may be quaternized by means of suitable alkylating agents. Examples for suitable alkylating agents are organic compounds which contain active halogen atoms, such as aralkyl halides, alkyl, alkenyl and alkynyl halides, and the like. Additionally, compounds such as the alkyl sulfates, alkyl sultones, epoxides, and the like may also be used. Examples of corresponding alkylating agents comprise benzyl chloride, propane sultone, dimethyl sulphate, (3-chloro-2-hydroxypropyl) trimethyl ammonium chloride, or the like. Preference is given to using dimethyl sulphate and/or benzyl chloride. However, preferably the polyalkanolamines are not quaternized by means of suitable alkylating agents.

In another embodiment the terminal hydroxy groups present in the polyalkanolamines may be substituted by means of suitable agents which are capable of reacting with hydroxy groups. In the following, the substitution of the OH groups is described, but it may also be applied to any primary or secondary amino groups present in the co-monomers fragments $B^L$.

The terminal hydroxyl groups may be alkylated. Examples for suitable alkylating agents those described above with respect to the quaternization of the tertiary amino groups. The terminal hydroxyl groups may also be esterified, for example, with sulfuric acid or derivatives thereof to form products with terminal sulfate groups (sulfatation). Analogously, products having terminal phosphorus groups can be obtained with phosphoric acid, phosphorous acid, polyphosphoric acid, $POCl_3$ or $P_4O_{10}$ (phosphatation). However, preferably the polyalkanolamines are not substituted, particularly not substitituted with any of the above substituents.

In yet another embodiment, the additive comprises or consists of a polyalkoxylated polyalkanolamine obtainable by polyalkoxylating the OH and, if applicable, NH groups of the polyalkanolamine with $C_2$- to $C_{12}$-alkylene oxides, styrene oxide, glycidol, or glycidyl ethers. It is particularly preferred to select the alkylene oxides from ethylene oxide, propylene oxide, butylene oxide or combinations thereof. In this case, preferably the average degree of alkoxylation is from 0.1 to 200, in particular from 0.5 to 20. The average degree of alkoxylation is the arithmetic average of the oxyalkylene units over all the polyoxyalkylene groups 1 to n attached to the respective O or N atom ($1/n \; \Sigma_{n=1}{}^n p$). Higher alkylene oxides are generally used, at most, in small amounts for fine adjustment of the properties. In general, the amount of ethylene oxide and/or propylene oxide and/or butylene oxide is at least 80% by weight, preferably 95% by weight and more preferably 95% by weight based on the sum of all alkylene oxides used. The average degree of alkoxylation may be from about 0.1 to about 200, preferably from about 0.1 to about 100, more preferably from about 0.1 to about 50, most preferably from about 0.5 to about 20 and, for example, 1 to 10 alkylene units per OH group and—where present—per secondary amino group in the starting material of the alkoxylation. When two or more different alkylene oxides are used, the polyoxyalkylene groups formed may be random copolymers, gradient copolymers or block copolymers. The synthesis of alkylene oxide units is known to those skilled in the art. Comprehensive details are given, for example, in "Polyoxyalkylenes" in Ullmann's Encyclopedia of Industrial Chemistry, 6$^{th}$ Edition, Electronic Release. However, preferably the polyalkanolamines are not polyalkoxylated.

Since the terminal hydroxy groups (OH groups) of the polyalkanolamines may be substituted or polyalkoxylated, they may particularly be described by the general formula L2

$$R^{L1}\text{-}[A^L]_n[B^L]_m\text{—}OR^{L2} \qquad \text{L2}$$

wherein $R^{L1}$ and $R^{L2}$ may be the same or different, preferably the same and be selected from H, $C_1$ to $C_6$ alkyl, polyoxy($C_2$-$C_{12}$)alkylene, sulfate, sulfonate, phosphate, phosphonate, and similar substituents. Most preferably the polyalkanolamies are used without any substitution, i.e. $R^{L1}$ and $R^{L2}$ are both H.

The viscosity of the resulting polyalkanolamines is typically in the range from 1000 to 50 000 mPa·s, preferably from 2000 to 20 000 mPa·s and more preferably from 3000 to 13 000 mPa·s (each measured on the undiluted product at 20° C.).

The mean molar mass $M_n$ (number average) of the resulting polyalkanolamines may typically be in the range from 250 to 50 000 g/mol, preferably from 500 to 40 000 g/mol, more preferably from 1000 to 20 000 g/mol and most preferably from 1000 to 7 500 g/mol.

The mean molar mass $M_w$ (weight average) of the resulting polyalkanolamines (II) may typically be in the range from 250 to 50 000 g/mol, preferably from 500 to 30 000 g/mol, more preferably from 1000 to 20 000 g/mol, and most 2000 to 10 000 g/mol.

The resulting polyalkanolamines may preferably have a polydispersity ($M_w/M_n$) in the range of 1 to 10, and in particular in the range of 1 to 5.

Preferred polyalkanolamines are those of formula L11

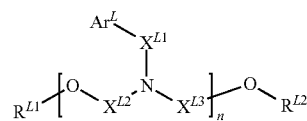

of formula L12

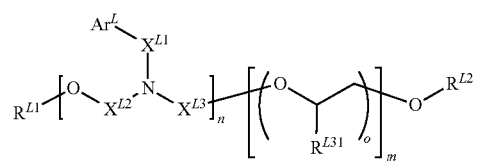

of formula L13

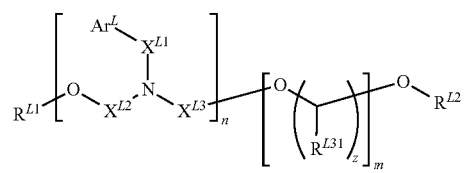

or of formula L14

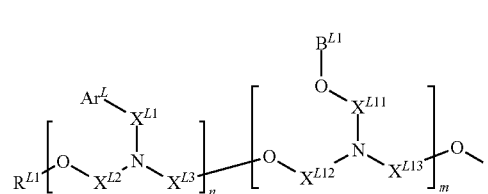

wherein $Ar^L$, $X^{L1}$, $X^{L2}$, $X^{L3}$, $X^{L1}$, $X^{L12}$, $X^{L13}$, $R^{L1}$, $R^{L2}$, $B^{L1}$, n, and m have the prescribed meanings; o is an integer of from 2 to 25, particularly from 3 to 20. z is an integer of from 1 to 8, particularly from 2 to 6; and $R^{L31}$ is H or a $C_1$ to $C_5$ alkyl, particularly H, methyl, ethyl or propyl, most particularly H. Preferably $R^{L1}$ and $R^{L2}$ are H or a $C_1$ to $C_4$ alkyl, more preferably H, methyl or ethyl, most preferably H.

Particularly preferred polyalkanolamines are those of formula L21

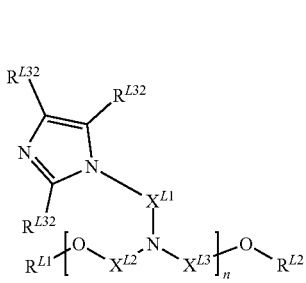

of formula L22

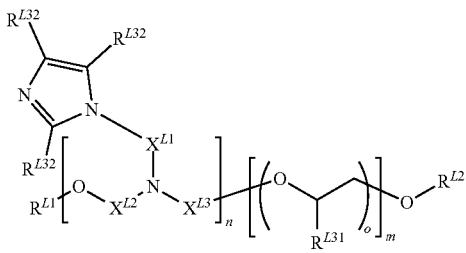

of formula L23

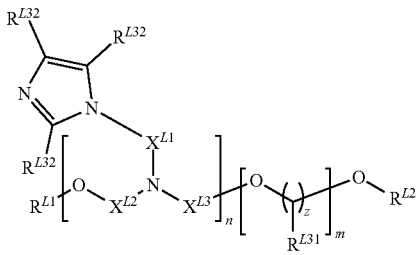

or of formula L24

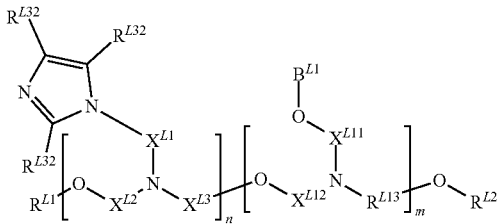

wherein $X^{L1}$, $X^{L2}$, $X^{L3}$, $X^{L11}$, $X^{L12}$, $X^{L13}$, $R^{L1}$, $R^{L2}$, $B^{L1}$, n, and m have the prescribed meanings, $R^{L32}$ may be H, a $C_1$ to $C_6$ alkyl group, or a $C_1$ to $C_6$ alkoxy group; o is 1 or an integer of from 2 to 25, particularly from 3 to 20; z is an integer of from 1 to 8, particularly from 2 to 6; and $R^{L31}$ is H or a $C_1$ to $C_5$ alkyl, particularly H, methyl, ethyl or propyl, most particularly H.

Particularly preferred polyalkanolamines are

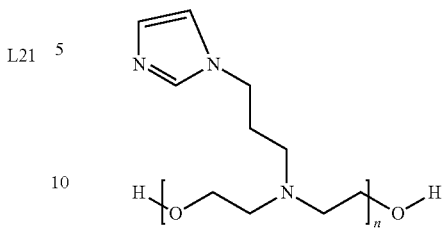

wherein n is as defined above. Particularly n may be an integer from 3 to 200, most particularly of from 4 to 150;

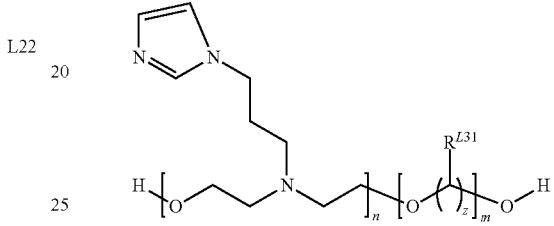

wherein n and m have the prescribed meanings. Particularly n may be an integer from 3 to 200, most particularly of from 4 to 150; m may be an integer from 3 to 250, most particularly of from 4 to 150; and z may be an integer of from 1 to 8, particularly from 2 to 6; and $R^{L3}$ is H, methyl or ethyl, preferably H, methyl, or a combination thereof;

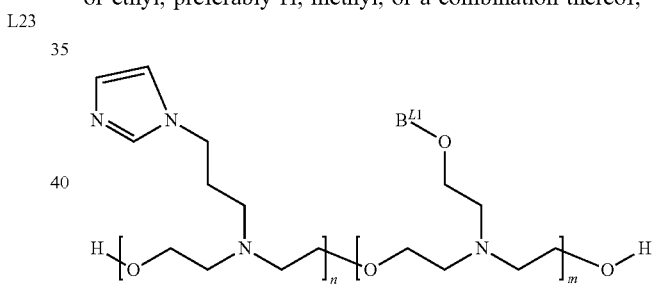

wherein n and m have the prescribed meanings. Particularly n may be an integer from 3 to 200, most particularly of from 4 to 150; m may be an integer from 3 to 250, most particularly of from 4 to 150; and

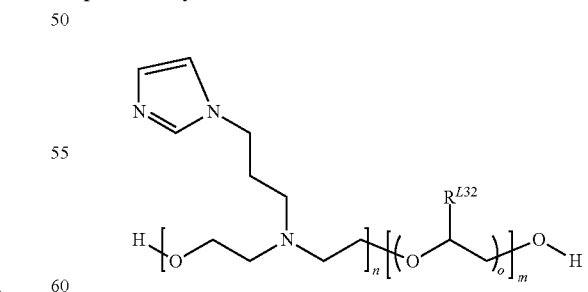

wherein $R^{L32}$, m, n, and o have the prescribed meanings. Particularly n may be an integer from 3 to 200, most particularly of from 4 to 150; m may be an integer from 3 to 250, most particularly of from 4 to 150; o may be an integer of from 3 to 20, z may be an integer of from 2 to 6, and $R^{L32}$ may be H or methyl, most preferably H.

Electroplating Composition

The polyalkanolamine according to the present invention is particularly useful as levelers in copper electroplating compositions. Besides copper ions such electroplating compositions comprise at least one additive comprising a polyalkanolamine as described herein.

In general, the total amount of leveling agents in the electroplating bath is from 0.05 ppm to 10000 ppm based on the total weight of the plating bath. The leveling agents according to the present invention are typically used in a total amount of from about 0.1 ppm to about 1000 ppm based on the total weight of the plating bath and more typically from 1 to 100 ppm, although greater or lesser amounts may be used.

Other Additives

A large variety of further additives may typically be used in the bath to provide desired surface finishes for the Cu plated metal. Usually more than one additive is used with each additive forming a desired function. Advantageously, the electroplating baths may contain one or more of accelerators, suppressors, sources of halide ions, grain refiners, and mixtures thereof. Most preferably the electroplating bath contains both, an accelerator and a suppressing agent in addition to the leveling agent according to the present invention. Other additives may also be suitably used in the present electroplating baths.

Accelerators

Any accelerators may be advantageously used in the plating baths according to the present invention. As used herein, "accelerator" refers to an organic additive that increases the plating rate of the electroplating bath. The terms "accelerator" and "accelerating agent" are used interchangeably throughout this specification. In literature, sometimes the accelerator component is also named "brightener", "brightening agent", or "depolarizer". Accelerators useful in the present invention include, but are not limited to, compounds comprising one or more sulphur atom and a sulfonic/phosphonic acid or their salts. Preferably the composition further comprises at least one accelerating agent.

Preferred accelerators have the general structure $MO_3Y^4—X^{41}—(S)_dR^{42}$, with:
- M is a hydrogen or an alkali metal, preferably Na or K;
- $Y^4$ is P or S, preferably S;
- d is an integer from 1 to 6, preferably 2;
- $X^{41}$ is selected from a $C_1$-$C_8$ alkanediyl or heteroalkanediyl group, a divalent aryl group or a divalent heteroaromatic group. Heteroalkyl groups will have one or more heteroatom (N, S, O) and 1-12 carbons. Carbocyclic aryl groups are typical aryl groups, such as phenyl or naphthyl. Heteroaromatic groups are also suitable aryl groups and contain one or more N, O or S atom and 1-3 separate or fused rings.
- $R^{42}$ is selected from H or ($—S—X^{41'}Y^4O_3M$), wherein $X^{41'}$ is independently selected from group $X^{41}$.

More specifically, useful accelerators include those of the following formulae:

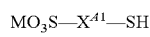

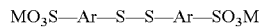

wherein $X^{41}$ is as defined above and Ar is aryl.

Particularly preferred accelerating agents are:
SPS: bis-(3-sulfopropyl)-disulfide
MPS: 3-mercapto-1-propansulfonic acid.

Both are usually applied in form of their salts, particularly their sodium salts.

Other examples of accelerators, used alone or in mixture, include, but are not limited to: MES (2-Mercaptoethanesulfonic acid, sodium salt); DPS (N,N-dimethyldithiocarbamic acid (3-sulfopropylester), sodium salt); UPS (3-[(amino-iminomethyl)-thio]-1-propylsulfonic acid); ZPS (3-(2-benzthiazolylthio)-1-propanesulfonic acid, sodium salt); 3-mercapto-propylsulfonicacid-(3-sulfopropyl)ester; methyl-(ω-sulphopropyl)-disulfide, disodium salt; methyl-(ω-sulphopropyl)-trisulfide, disodium salt.

Such accelerators are typically used in an amount of about 0.1 ppm to about 3000 ppm, based on the total weight of the plating bath. Particularly suitable amounts of accelerator useful in the present invention are 1 to 500 ppm, and more particularly 2 to 100 ppm.

Suppressing Agents

Suppressing agents may advantageously used in combination with the levelers according to the present inventions. As used herein, "suppressing agents" are additives which increase the overpotential during electrodeposition. There terms "surfactant" and "suppressing agent" are synonymously used since the suppressing agents described herein are also surface-active substances.

Particularly useful suppressing agents are:

(a) Suppressing agents obtainable by reacting an amine compound comprising at least three active amino functional groups with a mixture of ethylene oxide and at least one compound selected from $C_3$ and $C_4$ alkylene oxides as described in WO 2010/115796.

Preferably the amine compound is selected from diethylene triamine, 3-(2-aminoethyl)aminopropylamine, 3,3'-iminodi(propylamine), N,N-bis(3-aminopropyl)methylamine, bis(3-dimethylaminopropyl)amine, triethylenetetraamine and N,N'-bis(3-aminopropyl)ethylenediamine.

(b) Suppressing agents obtainable by reacting an amine compound comprising active amino functional groups with a mixture of ethylene oxide and at least one compound selected from $C_3$ and $C_4$ alkylene oxides, said suppressing agent having a molecular weight $M_w$ of 6000 g/mol or more, forming an ethylene $C_3$ and/or $C_4$ alkylene random copolymer as described in WO 2010/115756.

(c) Suppressing agent obtainable by reacting an amine compound comprising at least three active amino functional groups with ethylene oxide and at least one compound selected from $C_3$ and $C_4$ alkylene oxides from a mixture or in sequence, said suppressing agent having a molecular weight $M_w$ of 6000 g/mol or more as described in WO 2010/115757.

Preferably the amine compound is selected from ethylene diamine, 1,3-diaminopropane, 1,4-diaminobutane, 1,5-diaminopentane, 1,6-diaminohexane, neopentanediamine, isophoronediamine, 4,9-dioxadecane-1,12-diamine, 4,7,10-trioxyatridecane-1,13-diamine, triethylene glycol diamine, diethylene triamine, (3-(2-aminoethyl)aminopropylamine, 3,3'-iminodi(propylamine), N,N-bis(3-aminopropyl)methylamine, bis(3-dimethylaminopropyl)amine, triethylenetetraamine and N,N'-bis(3-aminopropyl)ethylenediamine.

(d) Suppressing agent selected from compounds of formula S1

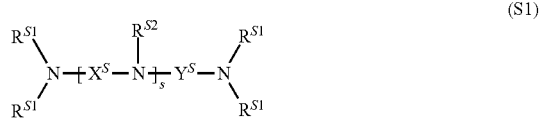

(S1)

wherein the $R^{S1}$ radicals are each independently selected from a copolymer of ethylene oxide and at least one further $C_3$ to $C_4$ alkylene oxide, said copolymer being a random copolymer, the $R^{S2}$ radicals are each independently selected from $R^{S1}$ or alkyl, $X^S$ and $Y^S$ are spacer groups independently, and $X^S$ for each repeating unit s independently, selected from $C_2$ to $C_6$ alkandiyl and $Z^S$—(O—$Z^S$)$_t$ wherein the $Z^S$ radicals are each independently selected from $C_2$ to $C_6$ alkandiyl, s is an integer equal to or greater than 0, and t is an integer equal to or greater than 1, as described in WO 2010/115717.

Preferably spacer groups $X^S$ and $Y^S$ are independently, and $X^S$ for each repeating unit independently, selected from $C_2$ to $C_4$ alkylene. Most preferably $X^S$ and $Y^S$ are independently, and $X^S$ for each repeating unit s independently, selected from ethylene (—$C_2H_4$—) or propylene (—$C_3H_6$—).

Preferably $Z^S$ is selected from $C_2$ to $C_4$ alkylene, most preferably from ethylene or propylene.

Preferably s is an integer from 1 to 10, more preferably from 1 to 5, most preferably from 1 to 3. Preferably t is an integer from 1 to 10, more preferably from 1 to 5, most preferably from 1 to 3.

In another preferred embodiment the $C_3$ to $C_4$ alkylene oxide is selected from propylene oxide (PO). In this case EO/PO copolymer side chains are generated starting from the active amino functional groups The content of ethylene oxide in the copolymer of ethylene oxide and the further $C_3$ to $C_4$ alkylene oxide can generally be from about 5% by weight to about 95% by weight, preferably from about 30% by weight to about 70% by weight, particularly preferably between about 35% by weight to about 65% by weight.

The compounds of formula (S1) are prepared by reacting an amine compound with one or more alkylene oxides. Preferably the amine compound is selected from ethylene diamine, 1,3-diaminopropane, 1,4-diaminobutane, 1,5-diaminopentane, 1,6-diaminohexane, neopentanediamine, isophoronediamine, 4,9-dioxadecane-1,12-diamine, 4,7,10-trioxatridecane-1,13-diamine, triethylene glycol diamine, diethylene triamine, (3-(2-aminoethyl)amino)propylamine, 3,3'-iminodi(propylamine), N,N-bis(3-aminopropyl)methylamine, bis(3-dimethylaminopropyl)amine, triethylenetetraamine and N,N'-bis(3-aminopropyl)ethylene-diamine.

The molecular weight $M_w$ of the suppressing agent of formula S1 may be between about 500 g/mol to about 30000 g/mol. Preferably the molecular weight $M_w$ should be about 6000 g/mol or more, preferably from about 6000 g/mol to about 20000 g/mol, more preferably from about 7000 g/mol to about 19000 g/mol, and most preferably from about 9000 g/mol to about 18000 g/mol. Preferred total amounts of alkylene oxide units in the suppressing agent may be from about 120 to about 360, preferably from about 140 to about 340, most preferably from about 180 to about 300.

Typical total amounts of alkylene oxide units in the suppressing agent may be about 110 ethylene oxide units (EO) and 10 propylene oxide units (PO), about 100 EO and 20 PO, about 90 EO and 30 PO, about 80 EO and 40 PO, about 70 EO and 50 PO, about 60 EO and 60 PO, about 50 EO and 70 PO, about 40 EO and 80 PO, about 30 EO and 90 PO, about 100 EO and 10 butylene oxide (BO) units, about 90 EO and 20 BO, about 80 EO and 30 BO, about 70 EO and 40 BO, about 60 EO and 50 BO or about 40 EO and 60 BO to about 330 EO and 30 PO units, about 300 EO and 60 PO, about 270 EO and 90 PO, about 240 EO and 120 PO, about 210 EO and 150 PO, about 180 EO and 180 PO, about 150 EO and 210 PO, about 120 EO and 240 PO, about 90 EO and 270 PO, about 300 EO and 30 BO units, about 270 EO and 60 BO, about 240 EO and 90 BO, about 210 EO and 120 BO, about 180 EO and 150 BO, or about 120 EO and 180 BO.

(e) Suppressing agent obtainable by reacting a polyhydric alcohol condensate compound derived from at least one polyalcohol of formula (S2) $X^S(OH)_u$ by condensation with at least one alkylene oxide to form a polyhydric alcohol condensate comprising polyoxyalkylene side chains, wherein u is an integer from 3 to 6 and $X^S$ is an u-valent linear or branched aliphatic or cycloaliphatic radical having from 3 to 10 carbon atoms, which may be substituted or unsubstituted, as described in WO 2011/012462.

Preferred polyalcohol condensates are selected from compounds of formulae

(S2a)

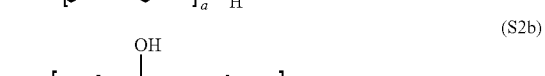

(S2b)

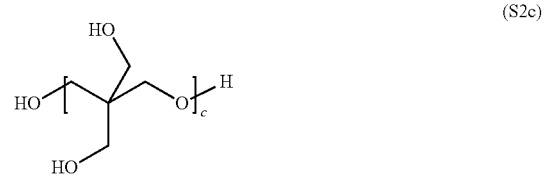

(S2c)

wherein $Y^S$ is an u-valent linear or branched aliphatic or cycloaliphatic radical having from 1 to 10 carbon atoms, which may be substituted or unsubstituted, a is an integer from 2 to 50, b may be the same or different for each polymer arm u and is an integer from 1 to 30, c is an integer from 2 to 3, and u is an integer from 1 to 6. Most preferred Polyalcohols are glycerol condensates and/or pentaerythritol condensates.

(f) Suppressing agent obtainable by reacting a polyhydric alcohol comprising at least 5 hydroxyl functional groups with at least one alkylene oxide to form a polyhydric alcohol comprising polyoxyalkylene side chains as described in WO 2011/012475. Preferred polyalcohols are linear or cyclic monosaccharide alcohols represented by formula (S3a) or (S3b)

$$HOCH_2—(CHOH)_v—CH_2OH \quad (S3a)$$

$$(CHOH)_w \quad (S3b)$$

wherein v is an integer from 3 to 8 and w is an integer from 5 to 10. Most preferred monosaccharide alcohols are sorbitol, mannitol, xylitol, ribitol and inositol. Further preferred polyalcohols are monosaccharides of formula (S4a) or (S4b)

$$CHO—(CHOH)_x—CH_2OH \quad (S4a)$$

$$CH_2OH—(CHOH)_y—CO—(CHOH)_z—CH_2OH \quad (S4b)$$

wherein x is an integer of 4 to 5, and y, z are integers and y+z is 3 or 4. Most preferred monosaccharide alcohols are selected from the aldoses allose, altrose, galactose, glucose, gulose, idose, mannose, talose, glucoheptose, mannoheptose or the ketoses fructose, psicose, sorbose, tagatose, mannoheptulose, sedoheptulose, taloheptulose, alloheptulose.

(g) amine-based polyoxyalkylene suppressing agents based on cyclic amines show extraordinary superfilling properties, as described in WO 2018/073011.

(h) polyamine-based or polyhydric alcohol-based suppressing agents which are modified by reaction with a compound, such as but not limited to glycidole or glycerol carbonate, that introduce a branching group into the suppressing agent before they are reacted with alkylene oxides show extraordinary superfilling properties, as described in WO 2018/114985.

When suppressors are used, they are typically present in an amount in the range of from about 1 to about 10 000 ppm based on the weight of the bath, and preferably from about 5 to about 10 000 ppm.

It will be appreciated by those skilled in the art that more than one leveling agent may be used. When two or more leveling agents are used, at least one of the leveling agents is a leveling agent according to the invention or a derivative thereof as described herein. It is preferred to use only one leveling agent in the plating composition.

Further Leveling Agents

Additional leveling agents can advantageously be used in the copper electroplating baths according to the present invention. When two or more leveling agents are used, at least one of the leveling agents is a polyalkanolamine or a derivative thereof as described herein. It is preferred to use only one leveling agent in the plating composition that is the polyalkanolamine according to the invention.

Suitable additional leveling agents include, but are not limited to, one or more of other polyethylene imines and derivatives thereof, quaternized polyethylene imine, polyglycine, poly(allylamine), polyaniline, polyurea, polyacrylamide, poly(melamine-co-formaldehyde), reaction products of amines with epichlorohydrin, reaction products of an amine, epichlorohydrin, and polyalkylene oxide, reaction products of an amine with a polyepoxide, polyvinylpyridine, polyvinylimidazole as described e.g. in WO 2011/151785 A1, polyvinylpyrrolidone, polyaminoamides as described e.g. in WO 2011/064154 A2 and WO 2014/072885 A2, or copolymers thereof, nigrosines, pentamethyl-para-rosaniline hydrohalide, hexamethyl-pararosaniline hydrohalide, di- or trialkanolamines and their derivatives as described in WO 2010/069810, biguanides as described in WO 2012/085811 A1, or a compound containing a functional group of the formula N—R—S, where R is a substituted alkyl, unsubstituted alkyl, substituted aryl or unsubstituted aryl. Typically, the alkyl groups are $C_1$-$C_6$ alkyl and preferably $C_1$-$C_4$ alkyl. In general, the aryl groups include $C_6$-$C_{20}$ aryl, preferably $C_6$-$C_{10}$ aryl. It is preferred that the aryl group is phenyl or naphthyl. The compounds containing a functional group of the formula N—R—S are generally known, are generally commercially available and may be used without further purification.

In such compounds containing the N—R—S functional group, the sulfur ("S") and/or the nitrogen ("N") may be attached to such compounds with single or double bonds. When the sulfur is attached to such compounds with a single bond, the sulfur will have another substituent group, such as but not limited to hydrogen, $C_1$-$C_{12}$ alkyl, $C_2$-$C_{12}$ alkenyl, $C_6$-$C_{20}$ aryl, $C_1$-$C_{12}$ alkylthio, $C_2$-$C_{12}$ alkenylthio, $C_6$-$C_{20}$ arylthio and the like. Likewise, the nitrogen will have one or more substituent groups, such as but not limited to hydrogen, $C_1$-$C_{12}$ alkyl, $C_2$-$C_{12}$ alkenyl, $C_7$-$C_{10}$ aryl, and the like. The N—R—S functional group may be acyclic or cyclic. Compounds containing cyclic N—R—S functional groups include those having either the nitrogen or the sulfur or both the nitrogen and the sulfur within the ring system.

In general, the total amount of leveling agents in the electroplating bath is from 0.5 ppm to 10000 ppm based on the total weight of the plating bath. The leveling agents according to the present invention are typically used in a total amount of from about 0.1 ppm to about 1000 ppm based on the total weight of the plating bath and more typically from 1 to 100 ppm, although greater or lesser amounts may be used.

More details and alternatives are described in WO 2018/219848, WO 2016/020216, and WO 2010/069810, respectively, which are incorporated herein by reference.

In general, the total amount of leveling agents in the electroplating bath is from 0.5 ppm to 10000 ppm based on the total weight of the plating bath. The leveling agents according to the present invention are typically used in a total amount of from about 100 ppm to about 10000 ppm based on the total weight of the plating bath, although greater or lesser amounts may be used.

Electrolyte

The copper ion source may be any compound capable of releasing metal ions to be deposited in the electroplating bath in sufficient amount, i.e. is at least partially soluble in the electroplating bath. It is preferred that the metal ion source is soluble in the plating bath. Suitable metal ion sources are metal salts and include, but are not limited to, metal sulfates, metal halides, metal acetates, metal nitrates, metal fluoroborates, metal alkylsulfonates, metal arylsulfonates, metal sulfamates, metal gluconates and the like.

The metal ion source may be used in the present invention in any amount that provides sufficient metal ions for electroplating on a substrate. When the metal is solely copper, it is typically present in an amount in the range of from about 1 to about 300 g/l of plating solution.

In a preferred embodiment the plating solution is essentially free of tin, that is, they contain 1% by weight tin, more preferably below 0.1% by weight, and yet more preferably below 0.01% by weight, and still more preferably are free of tin. In another preferred embodiment the plating solution is essentially free of any alloying metal, that is, they contain 1% by weight alloying metal, more preferably below 0.1% by weight, even more preferably below 0.01% by weight, and still more preferably are free of alloying metal. Most preferably the metal ions consist of copper ions, i.e. are free of any other ions besides copper.

Optionally, the plating baths according to the invention may contain one or more alloying metal ions up to an amount of 10% by weight, preferably up to 5% by weight, most preferably up to 2% by weight. Suitable alloying metals include, without limitation, silver, gold, tin, bismuth, indium, zinc, antimony, manganese and mixtures thereof. Preferred alloying metals are silver, tin, bismuth, indium, and mixtures thereof, and more preferably tin. Any bath-soluble salt of the alloying metal may suitably be used as the source of alloying metal ions. Examples of such alloying metal salts include but are not limited to: metal oxides; metal halides; metal fluoroborate; metal sulfates; metal alkanesulfonates such as metal methanesulfonate, metal ethanesulfonate and metal propanesulfonate; metal arylsulfonates such as metal phenylsulfonate, metal toluenesulfonate, and metal phenolsulfonate; metal carboxylates such as metal gluconate and metal acetate; and the like. Preferred alloying metal salts are metal sulfates; metal alkanesulfonates; and metal arylsulfonates. When one alloying metal is added to the present compositions, a binary alloy deposit is achieved. When 2, 3 or more different alloying metals are added to the present compositions, tertiary, quaternary or higher order alloy deposits are achieved. The amount of such alloying metal used in the present compositions will depend upon the particular tin-alloy desired. The selection of such amounts of alloying metals is within the ability of those skilled in the art. It will be appreciated by those skilled in the art that when certain alloying metals, such as silver, are used, an additional complexing agent may be required. Such complexing agents (or complexers) are well-known in the art and may be used in any suitable amount to achieve the desired tin-alloy composition.

The present electroplating compositions are suitable for depositing a copper-containing layer, which may preferably be a pure copper layer or alternatively a copper alloy layer comprising up to 10% by weight, preferably up to 5% by weight, most preferably up to 2% by weight of the alloying metal(s). Exemplary copper alloy layers include, without limitation, tin-silver, tin-copper, tin-indium, tin-bismuth, tin-silver-copper, tin-silver-copper-antimony, tin-silver-copper-manganese, tin-silver-bismuth, tin-silver-indium, tin-silver-zinc-copper, and tin-silver-indium-bismuth. Preferably, the present electroplating compositions deposit pure tin, tin-silver, tin-silver-copper, tin-indium, tin-silver-bismuth, tin-silver-indium, and tin-silver-indium-bismuth, and more preferably pure tin, tin-silver or tin-copper.

The alloy metal content may be measured by either atomic adsorption spectroscopy (AAS), X-ray fluorescence (XRF), inductively coupled plasma mass spectrometry (ICP-MS).

In general, besides the copper ions and at least one of the leveling agents, the present copper electroplating compositions preferably include an electrolyte, i.e. acidic or alkaline electrolyte, optionally halide ions, and optionally other additives like accelerators and suppressing agents. Such baths are typically aqueous.

In general, as used herein "aqueous" means that the present electroplating compositions comprises a solvent comprising at least 50% of water. Preferably, "aqueous" means that the major part of the composition is water, more preferably 90% of the solvent is water, most preferably the solvent consists or essentially consists of water. Any type of water may be used, such as distilled, deionized or tap.

Preferably, the plating baths of the invention are acidic, that is, they have a pH below 7. Typically, the pH of the copper electroplating composition is below 4, preferably below 3, most preferably below 2.

The electroplating baths of the present invention may be prepared by combining the components in any order. It is preferred that the inorganic components such as metal salts, water, acidic electrolyte and optional halide ion source, are first added to the bath vessel followed by the organic components such as accelerators, suppressing agents, leveling agents, and the like.

Suitable acidic electrolytes include such as, but not limited to, sulfuric acid, acetic acid, fluoroboric acid, alkylsulfonic acids such as methanesulfonic acid, ethanesulfonic acid, propanesulfonic acid and trifluoromethane sulfonic acid, arylsulfonic acids such as phenyl sulfonic acid and toluenesulfonic acid, sulfamic acid, hydrochloric acid, and phosphoric acid.

The acids are typically present in an amount in the range of from about 1 to about 300 g/l.

Such electrolytes may optionally (and preferably) contain a source of halide ions, such as chloride ions as in copper chloride or hydrochloric acid. A wide range of halide ion concentrations may be used in the present invention such as from about 0 to about 500 ppm. Preferably, the halide ion concentration is in the range of from about 10 to about 100 ppm based on the plating bath. It is preferred that the electrolyte is sulfuric acid or methanesulfonic acid, and preferably a mixture of sulfuric acid or methanesulfonic acid and a source of chloride ions. The acids and sources of halide ions useful in the present invention are generally commercially available and may be used without further purification.

Application and Process

The composition according to the invention is particularly useful for electrodepositing copper on a substrate comprising a recessed feature comprising a conductive feature bottom and a dielectric feature side wall, wherein the recessed feature has an aperture size from 500 nm to 500 µm. The leveling agents according to the present invention are particularly useful for filling of recessed features having aperture sizes of 1 to 200 µm. The leveling agents are particularly useful for depositing copper bumps.

An embodiment of the present invention is the use of the polyalkanolamines as decribed herein in a bath for copper electroplating.

Another embodiment of the present invention is a process for electrodepositing copper on a substrate comprising a recessed feature comprising a conductive feature bottom and a dielectric feature side wall, the process comprising:
a) contacting a composition as described herein with the substrate, and
b) applying a current to the substrate for a time sufficient to deposit a copper layer into the recessed feature,
wherein the recessed feature has an aperture size from 500 nm to 500 µm.

The process is particularly useful for depositing metal, particularly copper layers on substrate comprising micrometer or submicrometer-sized features. The micrometer or submicrometer-sized features preferably have a size from 1 to 200 µm.

The copper is deposited in recesses according to the present invention without substantially forming voids within the metal deposit. By the term "without substantially forming voids", it is meant that there are no voids in the metal deposit which are bigger than 1000 nm, preferably no voids in the metal deposit which are bigger than 500 nm, most preferably no voids in the metal deposit which are bigger than 100 nm. Most preferably the deposit is free of any defects.

Due to the leveling effect of the leveling agents, surfaces are obtained with an improved coplanarity of the plated copper bumps. The copper deposits show a good morphology, particularly a low roughness. The electroplating composition is capable of filling recessed features on the micrometer scale without substantially forming defects, such as but not limited to voids.

Furthermore, the leveling agents according to the invention lead to reduced impurities, such as but not limited to organics, chloride, sulfur, nitrogen, or other elements. It shows large grains and an improved conductivity. It also facilitates high plating rates and allows plating at elevated temperature.

In general, when the present invention is used to deposit copper on a substrate the plating baths are agitated during use. Any suitable agitation method may be used with the present invention and such methods are well-known in the art. Suitable agitation methods include, but are not limited to, inert gas or air sparging, work piece agitation, impingement and the like. Such methods are known to those skilled in the art. When the present invention is used to plate an integrated circuit substrate, such as a wafer, the wafer may be rotated such as from 1 to 150 RPM and the plating solution contacts the rotating wafer, such as by pumping or spraying. In the alternative, the wafer need not be rotated where the flow of the plating bath is sufficient to provide the desired metal deposit.

Plating equipments for plating semiconductor substrates are well known. Plating equipment comprises an electroplating tank which holds copper electrolyte and which is made of a suitable material such as plastic or other material inert to the electrolytic plating solution. The tank may be cylindrical, especially for wafer plating. A cathode is horizontally disposed at the upper part of tank and may be any type substrate such as a silicon wafer having openings.

These additives can be used with soluble and insoluble anodes in the presence or absence of a membrane or membranes separating the catholyte from the anolyte.

The cathode substrate and anode are electrically connected by wiring and, respectively, to a power supply. The cathode substrate for direct or pulse current has a net negative charge so that the metal ions in the solution are reduced at the cathode substrate forming plated metal on the cathode surface. An oxidation reaction takes place at the anode. The cathode and anode may be horizontally or vertically disposed in the tank.

In general, when preparing copper bumps, a photoresist layer is applied to a semiconductor wafer, followed by standard photolithographic exposure and development techniques to form a patterned photoresist layer (or plating mask) having recessed features like bumb holes therein. The dimensions of the dielectric plating mask (thickness of the plating mask and the size of the openings in the pattern) defines the size and location of the copper layer deposited over the I/O pad and under bump metallization (UBM). The diameter of such deposits typically range of from 1 to 200 µm, preferably in the range from 2 to 100 µm. Usually the recesses provided by the plating mask are not fully but only partly filled. After filling the openings in the plating mask with copper, the plating mask is removed, and then the copper bumps are usually subjected to reflow processing.

Typically, the plating baths of the present invention may be used at any temperature from 10 to 65° C. or higher. It is preferred that the temperature of the plating baths is from 10 to 35° C. and more preferably from 15 to 30° C.

All percent, ppm or comparable values refer to the weight with respect to the total weight of the respective composition except where otherwise indicated. All cited documents are incorporated herein by reference.

The following examples shall further illustrate the present invention without restricting the scope of this invention.

Analytical Methods

The molecular weight of the suppressing agents was determined by size-exclusion chromatography (SEC). Polystyrene was used as standard and tetrahydrofuran as effluent. The temperature of the column was 30° C., the injected volume 30 µl (microliter) and the flow rate 1.0 ml/min. The weight average molecular weight ($M_w$), the number average molecular weight ($M_n$) and the polydispersity PDI ($M_w/M_n$) of the suppressing agent were determined.

The amine number was determined according to DIN 53176 by titration of a solution of the polymer in acetic acid with perchloric acid.

The experiments were performed by using a 300 mm silicon wafer segment with a patterned photoresist 120 µm thick and a plurality of copper seeded 75 micrometers opening vias (available from IMAT, Inc., Vancouver, WA, USA).

The electroplated copper was investigated by a 3D laser scanning microscope (3D LSM). The height of the deposited copper layer in the bumps was determined visually.

The non-uniformity was determined from heights of totally 27 measured bumps, where 15 bumps in the dense area with a pitch size of 150 µm and 12 bumps with a pitch size of 375 µm were measured.

The coplanarity, an indicator of non-uniformity, was calculated from the heights by using the following formula:

$$COP[\%] = \frac{\text{bump height average } iso - \text{bump height average dense}}{\text{mean height}} \times 100$$

wherein
"bump height average iso" and "bump height average dense" are the arithmetic mean of each area. "mean height" is calculated by the sum of "bump height average iso" and "bump height average dense" divided by 2.

EXAMPLES

Example 1: Leveler Preparation

Example 1.1

Aminopropylimidazole (488.1 g) was placed into a 3.5 l autoclave. After nitrogen neutralization, the pressure was adjusted to 2 bar and the mixture was homogenized at 100° C. for 1 h. Then ethyleneoxide (343.6 g) was added over a period of 6 h. To complete the reaction, the mixture post-react for 6 hours at 100° C. Then the temperature was decreased to 80° C. and volatile compounds were removed in vacuum at 80° C. 2-(2-Hydroxyethyl-(3-imidazol-1-ylpropyl)-amino)ethanol was obtained with an hydroxy value of 496.7 mg/g KOH/g.

2-(2-Hydroxyethyl-(3-imidazol-1-ylpropyl)amino)ethanol (90 g), 1,6-hexanediole (47.3 g) and hypophosphoric acid (0.9 g) were placed in a 250 ml flask under nitrogen atmosphere and heated up to 227° C. The reaction mixture was stirred for 6 h while removing the resulting water out of the system. The product (Leveler 1) was obtained with an amine value of 5.81 mmol/g in a yield of 99.8%.

Example 1.2

Aminopropylimidazole (488.1 g) was placed into a 3.5 l autoclave. After nitrogen neutralization, the pressure was adjusted to 2 bar and the mixture was homogenized at 100° C. for 1 h. Then ethyleneoxide (343.6 g) was added over a period of 6 h. To complete the reaction, the mixture post-react for 6 hours at 100° C. Then the temperature was decreased to 80° C. and volatile compounds were removed in vacuum at 80° C. 2-(2-Hydroxyethyl-(3-imidazol-1-ylpropyl)-amino)ethanol was obtained with an hydroxy value of 496.7 mg/g KOH/g.

2-(2-Hydroxyethyl-(3-imidazol-1-ylpropyl)amino)ethanol (90 g), 1,5-pentanediole (42.9 g) and hypophosphoric acid (0.8 g) were placed in a 250 ml flask under nitrogen atmosphere and heated up to 227° C. The reaction mixture was stirred for 6 h while removing the resulting water out of the system. The product (Leveler 2) was obtained with an amine value of 6.1 mmol/g in a yield of 97.8%.

Example 1.3

Aminopropylimidazole (488.1 g) was placed into a 3.5 l autoclave. After nitrogen neutralization, the pressure was adjusted to 2 bar and the mixture was homogenized at 100° C. for 1 h. Then ethyleneoxide (343.6 g) was added over a period of 6 h. To complete the reaction, the mixture post-react for 6 hours at 100° C. Then the temperature was decreased to 80° C. and volatile compounds were removed in vacuum at 80° C. 2-(2-Hydroxyethyl-(3-imidazol-1-yl-propyl)-amino)ethanol was obtained with an hydroxy value of 496.7 mg/g KOH/g.

2-(2-Hydroxyethyl-(3-imidazol-1-ylpropyl)amino)etha-nol (94.5 g), Pluriol A350 E (140.3 g, available from BASF) and hypophosphoric acid (1.5 g) were placed in a 250 ml flask under nitrogen atmosphere and heated up to 227° C. The reaction mixture was stirred for 6 h while removing the resulting water out of the system. The product (Leveler 3) was obtained with an amine value of 3.4 mmol/g in a yield of 99.3%.

Example 1.4

Aminopropylimidazole (488.1 g) was placed into a 3.5 l autoclave. After nitrogen neutralization, the pressure was adjusted to 2 bar and the mixture was homogenized at 100° C. for 1 h. Then ethyleneoxide (343.6 g) was added over a period of 6 h. To complete the reaction, the mixture post-react for 6 hours at 100° C. Then the temperature was decreased to 80° C. and volatile compounds were removed in vacuum at 80° C. 2-(2-Hydroxyethyl-(3-imidazol-1-yl-propyl)-amino)ethanol was obtained with an hydroxy value of 496.7 mg/g KOH/g.

2-(2-Hydroxyethyl-(3-imidazol-1-ylpropyl)amino)etha-nol (100 g), triethanolamine (16.5 g) and hypophosphoric acid (0.4 g) were placed in a 250 ml flask under nitrogen atmosphere and heated up to 227° C. The reaction mixture was stirred for 6 h while removing the resulting water out of the system. The product (Leveler 4) was obtained with an amine value of 8.9 mmol/g in a yield of 96.2%.

Example 1.5

Aminopropylimidazole (488.1 g) was placed into a 3.5 l autoclave. After nitrogen neutralization, the pressure was adjusted to 2 bar and the mixture was homogenized at 100° C. for 1 h. Then ethyleneoxide (343.6 g) was added over a period of 6 h. To complete the reaction, the mixture post-react for 6 hours at 100° C. Then the temperature was decreased to 80° C. and volatile compounds were removed in vacuum at 80° C. 2-(2-Hydroxyethyl-(3-imidazol-1-yl-propyl)-amino)ethanol was obtained with an hydroxy value of 496.7 mg/g KOH/g.

2-(2-Hydroxyethyl-(3-imidazol-1-ylpropyl)amino)etha-nol (90.0 g), 1.8 octandiole (59.1 g) and hypophosphoric acid (0.9 g) were placed in a 250 ml flask under nitrogen atmosphere and heated up to 227° C. The reaction mixture was stirred for 6 h while removing the resulting water out of the system. The product (Leveler 5) was obtained with an amine value of 5.5 mmol/g in a yield of 99.2%.

Example 1.6

Aminopropylimidazole (488.1 g) was placed into a 3.5 l autoclave. After nitrogen neutralization, the pressure was adjusted to 2 bar and the mixture was homogenized at 100° C. for 1 h. Then ethyleneoxide (343.6 g) was added over a period of 6 h. To complete the reaction, the mixture post-react for 6 hours at 100° C. Then the temperature was decreased to 80° C. and volatile compounds were removed in vacuum at 80° C. 2-(2-Hydroxyethyl-(3-imidazol-1-yl-propyl)-amino)ethanol was obtained with an hydroxy value of 496.7 mg/g KOH/g.

2-(2-Hydroxyethyl-(3-imidazol-1-ylpropyl)amino)etha-nol (100 g) and hypophosphoric acid (0.6 g) were placed in a 250 ml flask under nitrogen atmosphere and heated up to 227° C. The reaction mixture was stirred for 6 h while removing the resulting water out of the system. The product (Leveler 6) was obtained with an amine value of 9.1 mmol/g in a yield of 96.5%.

Example 2: Electroplating Experiments

Example 2.1

A copper electroplating bath containing 51 g/l Cu ions, 100 g/l sulfuric acid and 50 ppm chloride has been used for the studies. In addition, the bath contains the following additives 50 ppm SPS, 100 ppm of an ethylene oxide polymer suppressor with an average molecular weight of 4000 g/mol and 20 ppm of leveler 1 of example 1.1.

The substrate is prewetted and electrically contacted prior plating. The copper layer was plated by using a bench top plating tool available from Yamamoto MS. The electrolyte convection was realized by a pump and a paddle in front of the substrate. The RPM of the paddle for all plating conditions were 50 RPM. Bath temperature was controlled and set to 25° C. and the applied current density was 4 ASD for 340 s and 8 ASD for 1875 s resulting in bumps of approximately 50 μm height.

The plated bumps were examined with an LSM as described in detail above. A coplanarity (COP) of 10.3% was determined.

The results are summarized in Table 1.

Example 2.2

A copper electroplating bath containing 51 g/l Cu ions, 100 g/l sulfuric acid and 50 ppm chloride has been used for the studies. In addition, the bath contains the following additives 50 ppm SPS, 100 ppm of an ethylene oxide polymer suppressor with an average molecular weight of 4000 g/mol and 20 ppm of leveler 2 of example 1.2.

The substrate is prewetted and electrically contacted prior plating. The copper layer was plated by using a bench top plating tool available from Yamamoto MS. The electrolyte convection was realized by a pump and a paddle in front of the substrate. The RPM of the paddle for all plating conditions were 50 RPM. Bath temperature was controlled and set to 25° C. and the applied current density was 4 ASD for 340 s and 8 ASD for 1875 s resulting in bumps of approximately 50 μm height.

The plated bumps were examined with an LSM as described in detail above. A coplanarity (COP) of 11.6% was determined.

The results are summarized in Table 1.

Example 2.3

A copper electroplating bath containing 51 g/l Cu ions, 100 g/l sulfuric acid and 50 ppm chloride has been used for the studies. In addition, the bath contains the following additives 50 ppm SPS, 100 ppm of an ethylene oxide polymer suppressor with an average molecular weight of 4000 g/mol and 20 ppm of leveler 3 of example 1.3.

The substrate is prewetted and electrically contacted prior plating. The copper layer was plated by using a bench top plating tool available from Yamamoto MS. The electrolyte convection was realized by a pump and a paddle in front of the substrate. The RPM of the paddle for all plating conditions were 50 RPM. Bath temperature was controlled and set to 25° C. and the applied current density was 4 ASD for 340 s and 8 ASD for 1875 s resulting in bumps of approximately 50 μm height.

The plated bumps were examined with an LSM as described in detail above. A coplanarity (COP) of 11.5% was determined.

The results are summarized in Table 1.

Example 2.4

A copper electroplating bath containing 51 g/l Cu ions, 100 g/l sulfuric acid and 50 ppm chloride has been used for the studies. In addition, the bath contains the following additives 50 ppm SPS, 100 ppm of an ethylene oxide polymer suppressor with an average molecular weight of 4000 g/mol and 20 ppm of leveler 8 of example 1.8.

The substrate is prewetted and electrically contacted prior plating. The copper layer was plated by using a bench top plating tool available from Yamamoto MS. The electrolyte convection was realized by a pump and a paddle in front of the substrate. The RPM of the paddle for all plating conditions were 50 RPM. Bath temperature was controlled and set to 25° C. and the applied current density was 4 ASD for 340 s and 8 ASD for 1875 s resulting in bumps of approximately 50 μm height.

The plated bumps were examined with an LSM as described in detail above. A coplanarity (COP) of 10.2% was determined.

The results are summarized in Table 1.

Example 2.5

A copper electroplating bath containing 51 g/l Cu ions, 100 g/l sulfuric acid and 50 ppm chloride has been used for the studies. In addition, the bath contains the following additives 50 ppm SPS, 100 ppm of an ethylene oxide polymer suppressor with an average molecular weight of 4000 g/mol and 20 ppm of leveler 8 of example 1.8.

The substrate is prewetted and electrically contacted prior plating. The copper layer was plated by using a bench top plating tool available from Yamamoto MS. The electrolyte convection was realized by a pump and a paddle in front of the substrate. The RPM of the paddle for all plating conditions were 50 RPM. Bath temperature was controlled and set to 25° C. and the applied current density was 4 ASD for 340 s and 8 ASD for 1875 s resulting in bumps of approximately 50 μm height.

The plated bumps were examined with an LSM as described in detail above. A coplanarity (COP) of 14.3% was determined.

The results are summarized in Table 1.

Example 2.6

A copper electroplating bath containing 51 g/l Cu ions, 100 g/l sulfuric acid and 50 ppm chloride has been used for the studies. In addition, the bath contains the following additives 50 ppm SPS, 100 ppm of an ethylene oxide polymer suppressor with an average molecular weight of 4000 g/mol and 20 ppm of leveler 8 of example 1.8.

The substrate is prewetted and electrically contacted prior plating. The copper layer was plated by using a bench top plating tool available from Yamamoto MS. The electrolyte convection was realized by a pump and a paddle in front of the substrate. The RPM of the paddle for all plating conditions were 50 RPM. Bath temperature was controlled and set to 25° C. and the applied current density was 4 ASD for 340 s and 8 ASD for 1875 s resulting in bumps of approximately 50 μm height.

The plated bumps were examined with an LSM as described in detail above. A coplanarity (COP) of 13.5% was determined.

The results are summarized in Table 1.

TABLE 1

| Example | Chemistry | WID COP [%] |
|---|---|---|
| 2.1 | (1,6-Hexanediole + 2-(2-Hydroxyethyl-(3-imidazol-1-yl-propyl)amino)ethanol) condensate (50:50) | 10.3 |
| 2.2 | (1,5-Pentanediole + 2-(2-Hydroxyethyl-(3-imidazol-1-yl-propyl)amino)ethanol) condensate (50:50) | 11.6 |
| 2.3 | (Pluriol A 350 E + 2-(2-Hydroxyethyl-(3-imidazol-1-yl-propyl)amino)ethanol) condensate (50:50) | 11.5 |
| 2.4 | (Triethanolamine + 2-(2-Hydroxyethyl-(3-imidazol-1-yl-propyl)amino)ethanol) condensate (20:80) | 10.2 |
| 2.5 | (1,8-Octandiole + 2-(2-Hydroxyethyl-(3-imidazol-1-yl-propyl)amino)ethanol) condensate (50:50) | 14.3 |
| 2.6 | (2-(2-Hydroxyethyl-(3-imidazol-1-ylpropyl)amino)ethanol) condensate | 13.5 |

Table 1 shows that all levelers lead to a good coplanarity well below 15, some of them even below 12.

The invention claimed is:

1. A polyalkanolamine comprising the structure of formula L1

$$[A^L]_n[B^L]_m \tag{1}$$

wherein

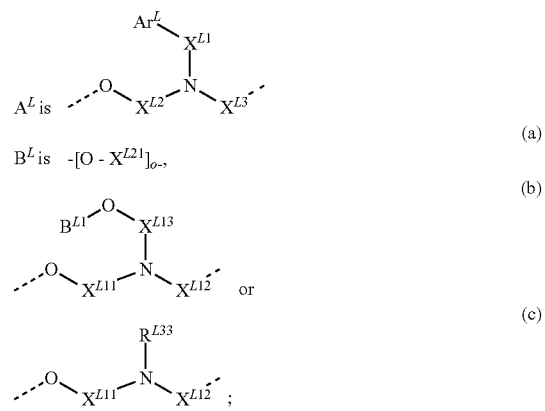

$X^{L1}$, $X^{L2}$, $X^{L3}$ are independently selected from the group consisting of $C_1$ to $C_6$ alkanediyl;

$Ar^L$ is a monovalent 5 or 6 membered N-heteroaromatic ring system comprising from 1 to 4 N atoms, which ring system may be unsubstituted or substituted by $C_1$ to $C_6$ alkyl;

n is an integer of from 2 to 350;

m is 0 or an integer of from 1 to 600;

o is 1 or an integer of from 2 to 25;

$B^{L1}$ is a continuation of the backbone $B^L$ by branching;

$R^{L33}$ is H or a $C_1$ to $C_6$ alkyl;
$X^{L11}$, $X^{L12}$, $X^{L13}$ are independently selected from the group consisting of $C_1$ to $C_6$ alkanediyl;
$X^{L21}$ is a $C_1$ to $C_8$ alkanediyl;
and derivatives thereof obtainable by N-protonation, N-quaternization, N- or O-substitution, or N- or O-alkoxylation.

2. The polyalkanolamine according to claim 1, wherein the additive is a compound of formula L2

wherein $R^{L1}$ and $R^{L2}$ are termination groups.

3. The polyalkanolamine according to claim 1, wherein $Ar^L$ is selected from the group consisting of imidazole-1-yl and pyridyl.

4. The polyalkanolamine according to claim 1, wherein $X^{L1}$, $X^{L2}$, and $X^{L3}$, and if applicable $X^{L11}$, $X^{L12}$, and $X^{L13}$ are independently selected from the group consisting of methanediyl, ethane-1,2-diyl, propane-1,3-diyl, propane-1,2-diyl, 2-methylpropane-1,2-diyl, 2,2-dimethylpropane-1,3-diyl, butane-1,4-diyl, butane-1,3-diyl, butane-1,2-diyl, butane-2,3-diyl, 2-methylbutane-1,3-diyl, 3-methylbutane-1,3-diyl, pentane-1,2-diyl, pentane-1,5-diyl, pentane-2,5-diyl, 2-methylpentane-2,5-diyl and hexane-1,6-diyl.

5. The polyalkanolamine according to claim 1, wherein m is 0.

6. The polyalkanolamine according to claim 5, wherein all fragments [$A^L$] in the polyalkanolamine of formula [$A^L$]$_n$ are the same.

7. The polyalkanolamine according to claim 5, wherein the polyalkanolamine is a compound of formula L11

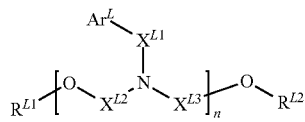

wherein
$R^{L1}$, $R^{L2}$ are independently selected from the group consisting of H, $C_1$ to $C_6$ alkyl, polyoxy($C_2$-$C_{12}$)alkylene, sulfate, sulfonate, phosphate, and phosphonate.

8. The polyalkanolamine according to claim 1, wherein m is an integer of from 3 to 250 and $B^L$ is selected from the group consisting of —[$X^{L21}$—O]$_o$—.

9. The polyalkanolamine according to claim 8, wherein the polyalkanolamine is a compound of formula L12

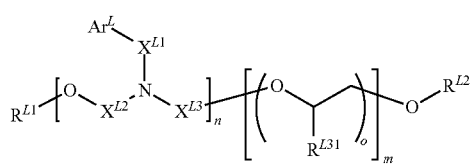

wherein
o is an integer from 2 to 20;
$R^{L1}$, $R^{L2}$ are independently selected from the group consisting of H, methyl, ethyl, propyl and butyl;
$R^{L31}$ is H, methyl, ethyl or propyl.

10. The polyalkanolamine according to claim 1, wherein the polyalkanolamine is a compound of formula L13

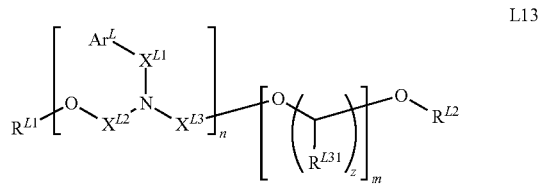

wherein
z is an integer of from 1 to 8;
$R^{L1}$, $R^{L2}$ are independently selected from the group consisting of H, methyl, ethyl, propyl and butyl; and
$R^{L31}$ is H, methyl, ethyl or propyl.

11. The polyalkanolamine according to claim 1, wherein the polyalkanolamine is a compound of formula L14

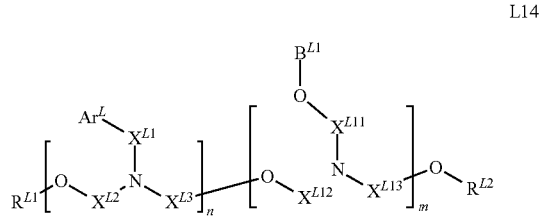

wherein
$R^{L1}$, $R^{L2}$ are independently selected from the group consisting of H, methyl, ethyl, propyl or butyl.

12. A composition for copper electroplating comprising copper ions and at least one polyalkanolamine according to claim 1.

13. The composition according to claim 12, wherein the pH is from 0 to 5.

14. The composition according to claim 12, further comprising one or more accelerating agents, one or more suppressing agents, or a combination thereof.

15. A method of using the composition according to claim 12, the method comprising using the composition for depositing copper on a substrate comprising a recessed feature comprising a conductive feature bottom and a dielectric feature side wall, wherein the recessed feature has an aperture size from 500 nm to 500 μm.

16. A process for electrodepositing copper on a substrate comprising a recessed feature comprising a conductive feature bottom and a dielectric feature side wall, the process comprising:
a) contacting a composition according to claim 12 with the substrate, and
b) applying a current to the substrate for a time sufficient to deposit a copper layer into the recessed feature, wherein the recessed feature has an aperture size from 500 nm to 500 μm.

17. The polyalkanolamine according to claim 1, wherein the additive is a compound of formula L2

wherein $R^{L1}$ and $R^{L2}$ are termination groups selected from the group consisting of H, $C_1$ to $C_6$ alkyl, polyoxy($C_2$-$C_{12}$)alkylene, sulfate, sulfonate, phosphate, and phosphonate.

18. The polyalkanolamine according to claim 8, wherein the polyalkanolamine is a compound of formula L12

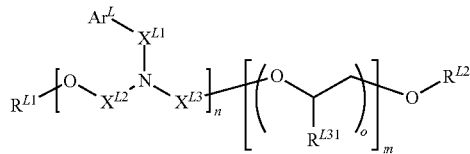

wherein
o is an integer from 2 to 20;
$R^{L1}$, $R^{L2}$ is H;
$R^{L31}$ is H.

19. The polyalkanolamine according to claim 1, wherein the polyalkanolamine is a compound of formula L13

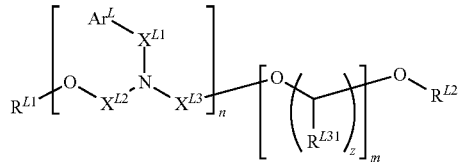

wherein
z is an integer of from 1 to 8;
$R^{L1}$, $R^{L2}$ is H; and
$R^{L31}$ is H.

20. The polyalkanolamine according to claim 1, wherein the polyalkanolamine is a compound of formula L14

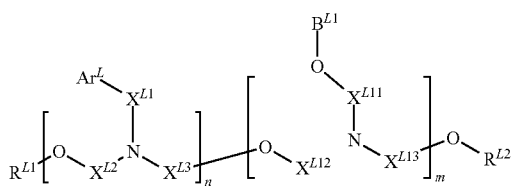

wherein
$R^{L1}$, $R^{L2}$ are each H.

* * * * *